United States Patent [19]

Swanepoel

[11] 3,714,558
[45] Jan. 30, 1973

[54] MAGNETIC SENSOR FOR DETECTING BREAKS IN A STEEL ROPE INCLUDING MULTIPLIER FOR ELIMINATING NOISE

[75] Inventor: Lourens Petrus Swanepoel, Johannesburg, South Africa

[73] Assignee: Anglo American Corporation of South Africa Limited

[22] Filed: Sept. 2, 1970

[21] Appl. No.: 68,863

[52] U.S. Cl. ................................................324/37
[51] Int. Cl. ..............................................G01r 33/12
[58] Field of Search ...........324/37, 40; 235/181, 194

[56] References Cited

UNITED STATES PATENTS 3,273,055   9/1966   Quittner.................................324/37
3,366,781   1/1968   Alexander............................324/77 G
3,424,976   1/1969   Jezewski et al.........................324/37
2,889,513   6/1959   Callan et al. ............................324/37

FOREIGN PATENTS OR APPLICATIONS 1,032,343   6/1966   Great Britain..........................324/37

Primary Examiner—Robert J. Corcoran
Attorney—Waters, Roditi, Schwartz & Nissen

[57] ABSTRACT

Apparatus for detecting wires in a steel wire winding rope in which the rope is passed through a magnetic field and sensing coils are employed to detect any magnetic dipoles created between the ends of broken wires in the rope. In order to minimize the effect of noise on the ultimate recordings the outputs of the sensing coils are multiplied in an analogue multiplier.

4 Claims, 3 Drawing Figures

PATENTED JAN 30 1973 3,714,558

MAGNETIC SENSOR FOR DETECTING BREAKS IN A STEEL ROPE INCLUDING MULTIPLIER FOR ELIMINATING NOISE

THIS invention relates to the electronic testing of winding ropes and more particularly to what has become known as the D.C. method of rope testing.

In this method, the essential purpose is to dectect broken wires in the rope under test. A split tubular magnet having a set of sensing coils located inside it, is located around the rope under test. The magnet produces a stationary axial magnetic flux along the rope of sufficient intensity to saturate the rope magnetically.

Any broken wires in the rope produce tiny magnetic dipoles across the gaps between the ends of the broken wires. When the rope moves through the test-head the passage of these dipoles past the sensing coils causes an e.m.f. to be induced into the sensing coils. The magnitude of this e.m.f. is directly proportional to the velocity of the rope and approximately inversely proportional to the square of the distance of the coil from the dipole in question. In ordinary instruments the outputs of the sensing coils are applied to pen galvanometers and any broken wires are therefore apparent from the strip chart thus produced.

The method and apparatus described above is satisfactory for ordinary lay ropes and ropes having a non-metallic core. Unfortunately nicked wires also produce an electrical output due to magnetic poles being formed across any discontinuous diameter. Pulses thus formed are termed noise since they play no part in the evaluation of the rope's characteristics.

In large diameter non-spin ropes having a high fill-factor (rather compact construction) it is impossible to detect a small pulse due to an internally broken wires amongst the vast number of higher magnitude "noise"-pulses generated by cross-nicking near the rope surface.

It is an object of the present invention to provide improved apparatus for detecting broken wires in winding ropes.

Apparatus according to the invention includes a circular magnet through which the rope is passed, at least two sensing coils surrounding the rope and adapted to detect the presence in the rope of any magnetic dipoles due to broken wires, means to multiply the output of one sensing coil by the output of the other sensing coil, and means to display the multiplied outputs.

Further according to the invention the multiplying means is of the type which produces no output when only one input exists by itself yet does not double the frequency when identical pulses are applied to its two inputs.

Further according to the invention the outputs of the two sensing coils are applied to the multiplying means through amplifiers the gain of each of which is inversely proportional to the rope speed so that the outputs of the amplifiers to the multiplying means are independent of rope speed.

To illustrate the invention an embodiment thereof is described hereunder with reference to the accompanying drawings in which.

Figure 1:
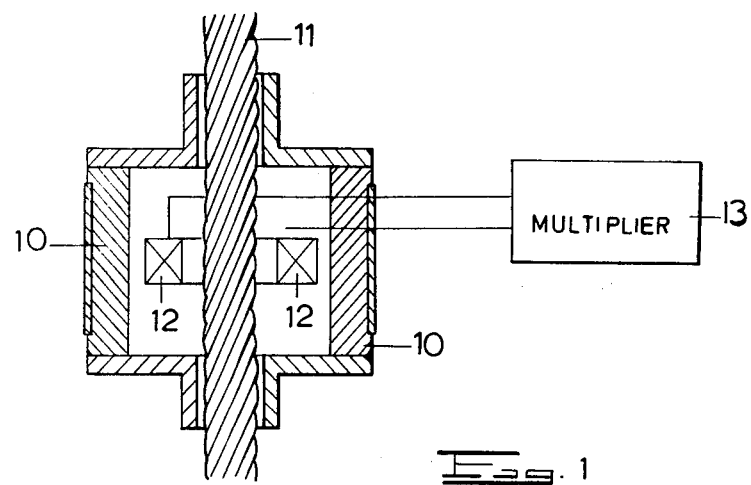
FIG. 1 is partly diagrammatical sectional elevation of the apparatus.
Figure 2:
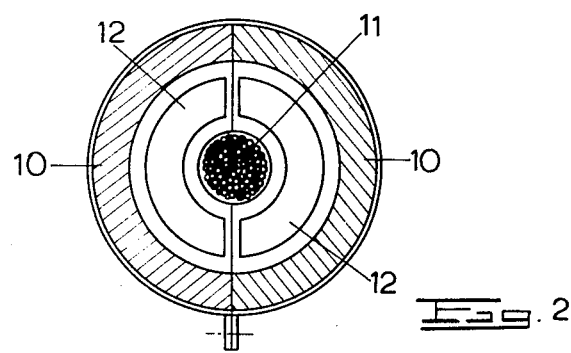
FIG. 2 is a sectional plan of the test-head assembly.

The principle of the present invention is illustrated in FIGS. 1 and 2. In these drawings a split tubular permanent magnet 10 is adapted to surround the rope 11 to be tested. Sensing coils 12 are located between each magnet half and the rope. The magnets and the sensing coils are preferably mounted in a compact test-head assembly.

As was explained at the beginning of this specification the axial magnetic field in the rope due to the circular magnets causes small magnetic dipoles to be created between the ends of broken wires in the rope. As the rope moves past the sensing coils, these small dipoles cause small voltages to be induced into the sensing coils and these voltages are applied to a multiplier 13 the output of which is applied to a pen galvanometer.

The step of multiplying the outputs of the sensing coils is the heart of the present invention. If one bears in mind that noise is a random signal and that the voltages induced into the sensing coils as a result of broken wires are always in phase, it will be appreciated that, by multiplying the voltages in the sensing coils, the noise pulses will be effectively eliminated in the strips of the pen galvanometer whereas the pulses due to the broken wires will be emphasized. The strips will thus be much easier to read than conventional strips of this type.

Figure 3:
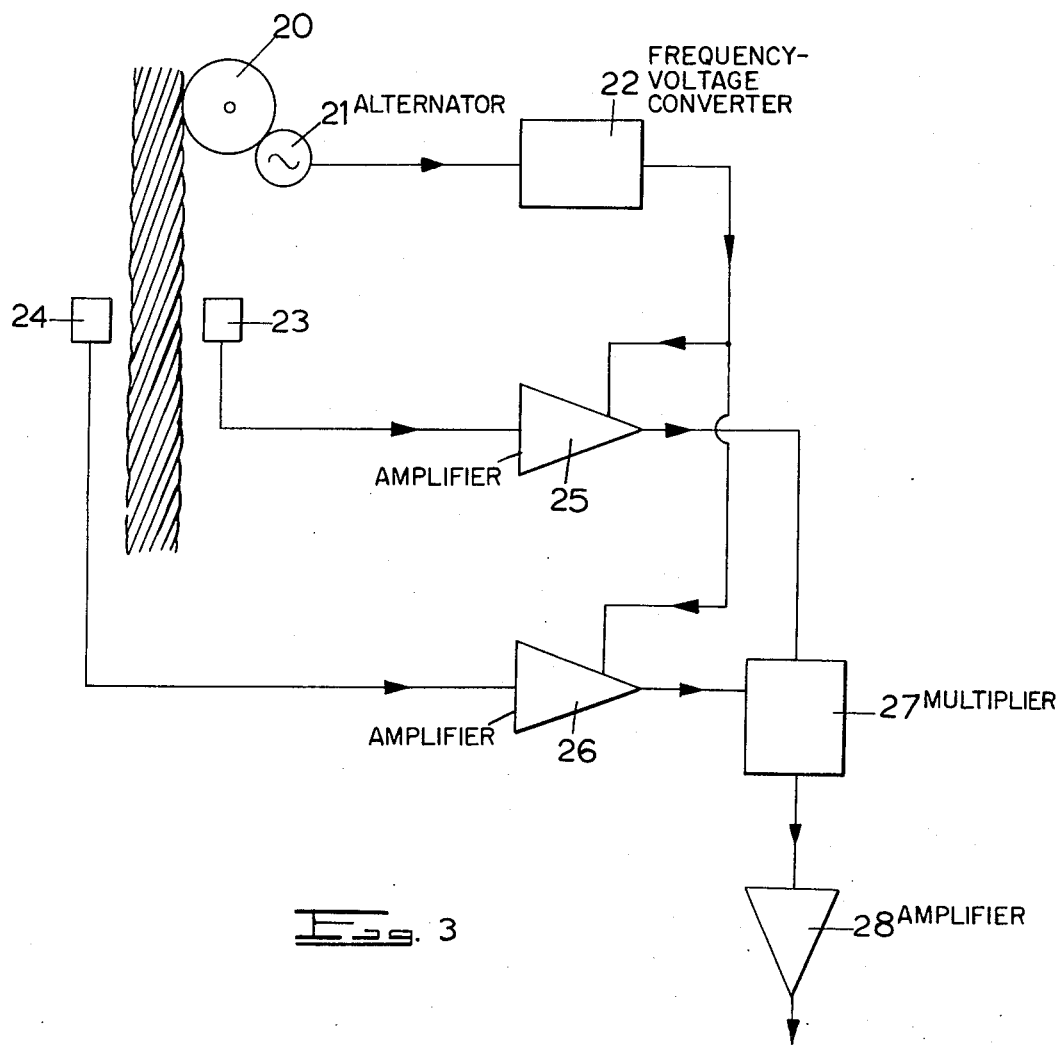
FIG. 3 is a block schematic diagram of the apparatus.

The invention is illustrated in more detail in FIG. 3. A rubber tire 20 is adapted to be driven by the rope to be tested. The tire 20 is in turn coupled by means of a set of gears to a miniature alternator 21 whose output is a frequency proportional to the speed of the rope. The amplitude of the alternator output is also dependent on the rope speed but this is irrelevant for the purposes of the invention.

The output of the alternator 21 is applied to a frequency to voltage converter 22. The output of the alternator 21 is thus a voltage proportional to rope speed.

The outputs of the sensing coils 23 and 24 are applied to amplifiers 25 and 26. Each of these amplifiers has gain which is inversely proportional to the output from the converter 22 which, in turn, is proportional to rope speed. The output of each of the amplifiers 25 and 26 is thus dependent of rope speed.

The outputs of the amplifiers are applied to a four quadrant analog multiplier 27 in which the outputs of the two amplifiers 25 and 26 are multiplied.

The output of the multiplier 27 is fed to a matching amplifier 28 before being fed to the pen galvanometer.

It can be shown mathematically that the multiplication of the two outputs from the amplifiers 25 and 26 will result in a large output from the multiplier 27 with no doubling of frequency, insofar as the in-phase voltages of the broken wires are concerned, and a small output of a higher frequency, insofar as the random noise signals are concerned. The galvanometer response is limited and the higher frequency noise components are therefore effectively filtered out by the galvanometer so that substantially only the in-phase signals are displayed on the galvanometer strip.

In a test on a particular rope with conventional equipment, the noise to signal ratio for broken wires in the center of the rope, was of the order of 6:1. This made it virtually impossible to detect the broken wires. When the same rope was tested with the equipment of the present invention the signal to noise ratio improved to 7:1. In other words the signal to noise ratio was improved by a factor of 42.

I claim:

1. Apparatus for detecting broken wires in a steel wire winding rope including a cylindrical magnet through which the rope is passed, at least two sensing coils surrounding the rope within the magnet and both lying in a plane perpendicular to the axis of the rope and adapted to detect the presence in the rope of any magnetic dipoles due to broken wires, means to multiply the output of one sensing coil by the output of the other sensing coil, said multiplying means effectively eliminating other random signals produced by defects in said wires, and means to display the multiplied outputs.

2. Apparatus as claimed in claim 1 in which the multiplying means is of the type which produces no output when only one input exists by itself yet does not double the frequency when identical pulses are applied to its two inputs.

3. Apparatus as claimed in claim 1 comprising amplifiers for applying the outputs of the two sensing coils to the multiplying means, and means responsive to the speed of the rope for adjusting the gain of said amplifiers thereby providing for an amplification which is inversely proportioned to the rope speed so that the outputs of the amplifiers to the multiplying means are independent of rope speed.

4. Apparatus as claimed in claim 1 in which the display means is a pen galvonometer.

* * * * *